United States Patent
Fish et al.

(10) Patent No.: US 9,118,612 B2
(45) Date of Patent: Aug. 25, 2015

(54) MEETING-SPECIFIC STATE INDICATORS

(75) Inventors: Nathan James Fish, Seattle, WA (US);
Leslie Rae Ferguson, Seattle, WA (US);
Jeffrey Berg, Seattle, WA (US); Nina F. Shih, Redmond, WA (US); Joo Young Lee, Redmond, WA (US); Derek Matthias Hans, Seattle, WA (US);
Kuldeep Karnawat, Seattle, WA (US);
Nicole Danielle Steinbok, Redmond, WA (US); Xiping Zuo, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 36 days.

(21) Appl. No.: 12/968,332

(22) Filed: Dec. 15, 2010

(65) Prior Publication Data

US 2012/0159347 A1    Jun. 21, 2012

(51) Int. Cl.
*G06Q 10/10* (2012.01)
*H04L 29/08* (2006.01)
*H04L 12/58* (2006.01)

(52) U.S. Cl.
CPC .............. *H04L 51/02* (2013.01); *H04L 51/04* (2013.01)

(58) Field of Classification Search
CPC ............ G06Q 10/109; G06Q 10/1093; G06Q 10/1095; G06Q 10/06311; G06Q 10/10; G06Q 10/0631; Y10S 715/963; H04L 12/5815; H04L 67/24
USPC ......... 715/705, 708, 730, 733, 751–759, 963, 715/716–726, 766, 768, 790–797, 808, 811, 715/813, 864; 705/7.13, 7.15, 7.19
See application file for complete search history.

(56) References Cited

U.S. PATENT DOCUMENTS

| 4,831,552 | A | * | 5/1989 | Scully et al. ............... 715/751 |
| 5,297,250 | A | | 3/1994 | Leroy et al. |
| 5,337,407 | A | | 8/1994 | Bates et al. |

(Continued)

FOREIGN PATENT DOCUMENTS

| CN | 1886977 | 12/2006 |
| CN | 101198976 | 6/2008 |

(Continued)

OTHER PUBLICATIONS

"Final Office Action", U.S. Appl. No. 12/473,206, (Dec. 7, 2011), 36 pages.

(Continued)

*Primary Examiner* — Andrew Tank
(74) *Attorney, Agent, or Firm* — Jessica Meyers; Jim Ross; Micky Minhas (57) ABSTRACT

A state client is configured to allow a user to specify a meeting-specific state, such as that the user is running late for a meeting, checked in to the meeting, or unable to attend the meeting. A state service stores data identifying the user's meeting-specific state. The state service also responds to requests for the state of the user. In one implementation, when such a request is received, the state service determines whether the user is an invitee to the same meeting as the user requesting the state. If not, the state service returns a general-purpose state indicator for the user. If both users are invitees to the same meeting, the state service returns the meeting-specific state indicator, which may then be displayed by a state client.

20 Claims, 7 Drawing Sheets

(56) References Cited

U.S. PATENT DOCUMENTS

| | | | |
|---|---|---|---|
| 5,339,389 A | 8/1994 | Bates et al. | |
| 5,495,269 A | 2/1996 | Elrod et al. | |
| 5,566,291 A | 10/1996 | Boulton et al. | |
| 5,675,752 A | 10/1997 | Scott et al. | |
| 5,704,029 A | 12/1997 | Wright, Jr. | |
| 5,717,869 A | 2/1998 | Moran et al. | |
| 5,802,299 A | 9/1998 | Logan et al. | |
| 5,821,925 A | 10/1998 | Carey et al. | |
| 5,821,932 A | 10/1998 | Pittore | |
| 5,893,098 A | 4/1999 | Peters et al. | |
| 5,907,324 A | 5/1999 | Larson et al. | |
| 6,016,478 A | 1/2000 | Zhang et al. | |
| 6,018,346 A | 1/2000 | Moran et al. | |
| 6,049,334 A | 4/2000 | Bates et al. | |
| 6,119,147 A | 9/2000 | Toomey et al. | |
| 6,192,395 B1 | 2/2001 | Lerner et al. | |
| 6,208,339 B1 | 3/2001 | Atlas et al. | |
| 6,230,185 B1 | 5/2001 | Salas et al. | |
| 6,353,436 B1 | 3/2002 | Reichlen | |
| 6,553,417 B1 | 4/2003 | Gampper | |
| 6,564,246 B1 | 5/2003 | Varma et al. | |
| 6,633,315 B1 | 10/2003 | Sobeski et al. | |
| 6,670,970 B1 | 12/2003 | Bonura et al. | |
| 6,735,615 B1 | 5/2004 | Iwayama et al. | |
| 6,738,075 B1 | 5/2004 | Torres et al. | |
| 7,035,865 B2 * | 4/2006 | Doss et al. | 1/1 |
| 7,036,076 B2 | 4/2006 | Anwar | |
| 7,051,285 B1 | 5/2006 | Harrison et al. | |
| 7,073,127 B2 | 7/2006 | Zhao et al. | |
| 7,075,513 B2 | 7/2006 | Silfverberg et al. | |
| 7,124,164 B1 | 10/2006 | Chemtob | |
| 7,171,567 B1 | 1/2007 | Bayer et al. | |
| 7,203,479 B2 | 4/2007 | Deeds | |
| 7,225,257 B2 | 5/2007 | Aoike et al. | |
| 7,228,492 B1 | 6/2007 | Graham | |
| 7,233,933 B2 * | 6/2007 | Horvitz et al. | 706/21 |
| 7,242,389 B1 | 7/2007 | Stern | |
| 7,246,316 B2 | 7/2007 | Furlong et al. | |
| 7,248,677 B2 * | 7/2007 | Randall et al. | 379/93.23 |
| 7,251,786 B2 | 7/2007 | Wynn et al. | |
| 7,257,769 B2 | 8/2007 | Caspi | |
| 7,269,787 B2 | 9/2007 | Amitay et al. | |
| 7,299,193 B2 | 11/2007 | Cragun et al. | |
| 7,299,405 B1 | 11/2007 | Lee et al. | |
| 7,299,418 B2 | 11/2007 | Dieberger | |
| 7,401,300 B2 | 7/2008 | Nurmi | |
| 7,426,297 B2 | 9/2008 | Zhang et al. | |
| 7,451,183 B2 | 11/2008 | Romero et al. | |
| 7,451,186 B2 | 11/2008 | Morinigo et al. | |
| 7,454,439 B1 | 11/2008 | Gansner et al. | |
| 7,466,334 B1 | 12/2008 | Baba | |
| 7,469,222 B1 | 12/2008 | Glazer | |
| 7,478,129 B1 | 1/2009 | Chemtob et al. | |
| 7,512,906 B1 | 3/2009 | Baier et al. | |
| 7,554,576 B2 | 6/2009 | Erol et al. | |
| 7,571,210 B2 * | 8/2009 | Swanson et al. | 709/204 |
| 7,590,941 B2 | 9/2009 | Wee et al. | |
| 7,599,989 B2 | 10/2009 | Stevens et al. | |
| 7,606,862 B2 * | 10/2009 | Swearingen et al. | 709/206 |
| 7,627,830 B1 | 12/2009 | Espinoza et al. | |
| 7,636,754 B2 | 12/2009 | Zhu et al. | |
| 7,669,141 B1 | 2/2010 | Pegg | |
| 7,679,518 B1 | 3/2010 | Pabla et al. | |
| 7,730,411 B2 | 6/2010 | Chotai et al. | |
| 7,743,098 B2 * | 6/2010 | Anglin et al. | 709/204 |
| 7,764,247 B2 | 7/2010 | Blanco et al. | |
| 7,770,116 B2 | 8/2010 | Zhang et al. | |
| 7,774,221 B2 * | 8/2010 | Miller et al. | 705/7.19 |
| 7,774,703 B2 | 8/2010 | Junuzovic et al. | |
| 7,818,678 B2 | 10/2010 | Massand | |
| 7,869,941 B2 * | 1/2011 | Coughlin et al. | 701/533 |
| 7,911,409 B1 | 3/2011 | Chatterjee et al. | |
| 7,941,399 B2 | 5/2011 | Bailor et al. | |
| 7,962,525 B2 | 6/2011 | Kansal | |
| 7,984,387 B2 * | 7/2011 | Batthish et al. | 715/812 |
| 7,992,089 B2 * | 8/2011 | Murray et al. | 715/753 |
| 8,032,832 B2 | 10/2011 | Russ et al. | |
| 8,099,458 B2 | 1/2012 | Burtner, IV et al. | |
| 8,126,974 B2 * | 2/2012 | Lyle et al. | 709/206 |
| 8,150,719 B2 * | 4/2012 | Perrella et al. | 705/7.19 |
| 8,161,419 B2 * | 4/2012 | Palahnuk et al. | 715/781 |
| 8,204,942 B2 * | 6/2012 | Roskind et al. | 709/206 |
| 8,214,748 B2 * | 7/2012 | Srikanth et al. | 715/751 |
| 8,330,795 B2 * | 12/2012 | Iyer et al. | 348/14.09 |
| 8,352,870 B2 | 1/2013 | Bailor et al. | |
| 8,358,762 B1 * | 1/2013 | Renner et al. | 379/202.01 |
| 8,385,964 B2 * | 2/2013 | Haney | 455/519 |
| 8,437,461 B1 * | 5/2013 | Gartner | 379/202.01 |
| 8,452,839 B2 * | 5/2013 | Heikes et al. | 709/206 |
| 8,560,487 B2 * | 10/2013 | Jhoney et al. | 706/52 |
| 8,583,148 B2 * | 11/2013 | Ollila et al. | 455/466 |
| 8,606,517 B1 * | 12/2013 | Ehrlacher et al. | 701/465 |
| 8,631,119 B2 * | 1/2014 | Malkin et al. | 709/224 |
| 8,667,401 B1 | 3/2014 | Lozben | |
| 8,682,973 B2 | 3/2014 | Kiken-Gil et al. | |
| 8,768,308 B2 * | 7/2014 | Kim et al. | 455/412.2 |
| 2001/0040592 A1 | 11/2001 | Foreman et al. | |
| 2002/0143876 A1 | 10/2002 | Boyer et al. | |
| 2002/0143877 A1 | 10/2002 | Hackbarth et al. | |
| 2003/0020805 A1 | 1/2003 | Allen et al. | |
| 2003/0046296 A1 | 3/2003 | Doss | |
| 2003/0122863 A1 | 7/2003 | Dieberger et al. | |
| 2003/0137539 A1 | 7/2003 | Dees | |
| 2003/0142133 A1 | 7/2003 | Brown et al. | |
| 2003/0158900 A1 | 8/2003 | Santos | |
| 2003/0179230 A1 | 9/2003 | Seidman | |
| 2003/0220973 A1 | 11/2003 | Zhu et al. | |
| 2003/0222890 A1 | 12/2003 | Salesin et al. | |
| 2004/0024822 A1 | 2/2004 | Werndorfer et al. | |
| 2004/0027370 A1 | 2/2004 | Jaeger | |
| 2004/0030992 A1 | 2/2004 | Moisa et al. | |
| 2004/0062383 A1 | 4/2004 | Sylvain | |
| 2004/0085354 A1 | 5/2004 | Massand | |
| 2004/0128350 A1 | 7/2004 | Topfl et al. | |
| 2004/0150627 A1 | 8/2004 | Luman et al. | |
| 2004/0161090 A1 * | 8/2004 | Digate et al. | 379/202.01 |
| 2004/0169683 A1 | 9/2004 | Chiu et al. | |
| 2004/0175036 A1 | 9/2004 | Graham | |
| 2004/0194033 A1 | 9/2004 | Holzwarth et al. | |
| 2004/0196286 A1 | 10/2004 | Guzik | |
| 2004/0230594 A1 | 11/2004 | Flam et al. | |
| 2004/0250201 A1 | 12/2004 | Caspi | |
| 2004/0254998 A1 | 12/2004 | Horvitz | |
| 2004/0263636 A1 | 12/2004 | Cutler et al. | |
| 2004/0267701 A1 | 12/2004 | Horvitz et al. | |
| 2005/0005025 A1 | 1/2005 | Harville et al. | |
| 2005/0018828 A1 | 1/2005 | Nierhaus et al. | |
| 2005/0055625 A1 | 3/2005 | Kloss | |
| 2005/0081160 A1 | 4/2005 | Wee et al. | |
| 2005/0088410 A1 | 4/2005 | Chaudhri | |
| 2005/0091571 A1 | 4/2005 | Leichtling | |
| 2005/0125246 A1 | 6/2005 | Muller et al. | |
| 2005/0125717 A1 | 6/2005 | Segal et al. | |
| 2005/0138109 A1 | 6/2005 | Redlich et al. | |
| 2005/0138570 A1 | 6/2005 | Good et al. | |
| 2005/0171830 A1 | 8/2005 | Miller et al. | |
| 2005/0285845 A1 | 12/2005 | Dehlin | |
| 2006/0004911 A1 * | 1/2006 | Becker et al. | 709/207 |
| 2006/0010023 A1 | 1/2006 | Tromczynski et al. | |
| 2006/0010197 A1 | 1/2006 | Overden | |
| 2006/0026253 A1 * | 2/2006 | Kessen et al. | 709/207 |
| 2006/0053380 A1 * | 3/2006 | Spataro et al. | 715/753 |
| 2006/0067250 A1 | 3/2006 | Boyer et al. | |
| 2006/0080610 A1 | 4/2006 | Kaminsky | |
| 2006/0082594 A1 | 4/2006 | Vafiadis et al. | |
| 2006/0094441 A1 | 5/2006 | Beckmann et al. | |
| 2006/0132507 A1 | 6/2006 | Wang | |
| 2006/0136828 A1 | 6/2006 | Asano et al. | |
| 2006/0143064 A1 * | 6/2006 | Mock et al. | 705/9 |
| 2006/0146765 A1 | 7/2006 | Van De Sluis et al. | |
| 2006/0161585 A1 | 7/2006 | Clarke et al. | |
| 2006/0167996 A1 | 7/2006 | Orsolini et al. | |
| 2006/0168533 A1 | 7/2006 | Yip et al. | |
| 2006/0171515 A1 | 8/2006 | Hintermeister et al. | |

(56) References Cited

U.S. PATENT DOCUMENTS

| | | |
|---|---|---|
| 2006/0184872 A1 | 8/2006 | Dontcheva et al. |
| 2006/0190547 A1* | 8/2006 | Bhogal et al. ............... 709/207 |
| 2006/0195587 A1 | 8/2006 | Cadiz et al. |
| 2006/0234735 A1 | 10/2006 | Digate et al. |
| 2006/0239212 A1 | 10/2006 | Pirzada et al. |
| 2006/0259875 A1 | 11/2006 | Collins et al. |
| 2006/0265398 A1 | 11/2006 | Kaufman |
| 2006/0282759 A1 | 12/2006 | Collins et al. |
| 2007/0005752 A1 | 1/2007 | Chawla et al. |
| 2007/0011231 A1* | 1/2007 | Manion et al. ............... 709/204 |
| 2007/0033091 A1 | 2/2007 | Ravikumar et al. |
| 2007/0083597 A1 | 4/2007 | Salesky et al. |
| 2007/0100937 A1 | 5/2007 | Burtner, IV et al. |
| 2007/0109939 A1 | 5/2007 | Shimizu et al. |
| 2007/0112926 A1 | 5/2007 | Brett et al. |
| 2007/0150583 A1 | 6/2007 | Asthana et al. |
| 2007/0168447 A1* | 7/2007 | Chen et al. ............... 709/207 |
| 2007/0174389 A1 | 7/2007 | Armstrong et al. |
| 2007/0185870 A1 | 8/2007 | Hogue et al. |
| 2007/0186171 A1 | 8/2007 | Junuzovic et al. |
| 2007/0189487 A1 | 8/2007 | Sharland et al. |
| 2007/0214423 A1 | 9/2007 | Teplov et al. |
| 2007/0219645 A1 | 9/2007 | Thomas et al. |
| 2007/0226032 A1 | 9/2007 | White et al. |
| 2007/0226299 A1 | 9/2007 | Shaffer et al. |
| 2007/0245238 A1 | 10/2007 | Fugitt et al. |
| 2007/0253424 A1 | 11/2007 | Herot et al. |
| 2007/0276909 A1 | 11/2007 | Chavda et al. |
| 2007/0279416 A1 | 12/2007 | Cobb et al. |
| 2007/0294612 A1 | 12/2007 | Drucker et al. |
| 2007/0300185 A1 | 12/2007 | Macbeth et al. |
| 2008/0001717 A1 | 1/2008 | Fiatal |
| 2008/0005235 A1 | 1/2008 | Hegde et al. |
| 2008/0008458 A1 | 1/2008 | Gudipaty et al. |
| 2008/0013698 A1 | 1/2008 | Holtzberg |
| 2008/0022225 A1 | 1/2008 | Erl |
| 2008/0040187 A1* | 2/2008 | Carraher et al. ............... 705/9 |
| 2008/0040188 A1* | 2/2008 | Klausmeier ............... 705/9 |
| 2008/0059889 A1 | 3/2008 | Parker et al. |
| 2008/0065580 A1 | 3/2008 | Spence |
| 2008/0084984 A1 | 4/2008 | Levy et al. |
| 2008/0098328 A1 | 4/2008 | Rollin et al. |
| 2008/0109406 A1 | 5/2008 | Krishnasamy et al. |
| 2008/0114844 A1 | 5/2008 | Sanchez et al. |
| 2008/0115076 A1 | 5/2008 | Frank et al. |
| 2008/0133551 A1 | 6/2008 | Wensley et al. |
| 2008/0136897 A1 | 6/2008 | Morishima et al. |
| 2008/0141126 A1 | 6/2008 | Johnson et al. |
| 2008/0147790 A1 | 6/2008 | Malaney et al. |
| 2008/0177782 A1 | 7/2008 | Poston et al. |
| 2008/0189624 A1 | 8/2008 | Chotai et al. |
| 2008/0239995 A1 | 10/2008 | Lee et al. |
| 2008/0244442 A1 | 10/2008 | Veselova et al. |
| 2008/0263010 A1 | 10/2008 | Roychoudhuri et al. |
| 2008/0263460 A1 | 10/2008 | Altberg et al. |
| 2008/0276174 A1 | 11/2008 | Hintermeister et al. |
| 2008/0288889 A1 | 11/2008 | Hunt et al. |
| 2008/0300944 A1 | 12/2008 | Surazski et al. |
| 2008/0303746 A1 | 12/2008 | Schlottmann et al. |
| 2008/0307322 A1 | 12/2008 | Stochosky et al. |
| 2008/0320082 A1 | 12/2008 | Kuhlke et al. |
| 2009/0006980 A1 | 1/2009 | Hawley et al. |
| 2009/0006982 A1 | 1/2009 | Curtis et al. |
| 2009/0019367 A1 | 1/2009 | Cavagnari et al. |
| 2009/0030766 A1* | 1/2009 | Denner et al. ............... 705/9 |
| 2009/0043856 A1 | 2/2009 | Darby |
| 2009/0055739 A1 | 2/2009 | Murillo et al. |
| 2009/0089055 A1 | 4/2009 | Caspi et al. |
| 2009/0094367 A1 | 4/2009 | Song et al. |
| 2009/0109180 A1 | 4/2009 | Do et al. |
| 2009/0119255 A1 | 5/2009 | Frank et al. |
| 2009/0119604 A1 | 5/2009 | Simard et al. |
| 2009/0129596 A1 | 5/2009 | Chavez et al. |
| 2009/0138552 A1 | 5/2009 | Johnson et al. |
| 2009/0138826 A1 | 5/2009 | Barros |
| 2009/0204671 A1* | 8/2009 | Hawkins et al. ............... 709/204 |
| 2009/0210822 A1 | 8/2009 | Schindler |
| 2009/0222741 A1 | 9/2009 | Shaw et al. |
| 2009/0228569 A1 | 9/2009 | Kalmanje et al. |
| 2009/0234721 A1 | 9/2009 | Bigelow et al. |
| 2009/0235177 A1 | 9/2009 | Saul et al. |
| 2009/0254843 A1 | 10/2009 | Van Wie et al. |
| 2009/0265632 A1 | 10/2009 | Russ et al. |
| 2009/0282339 A1 | 11/2009 | Van Melle et al. |
| 2009/0309846 A1 | 12/2009 | Trachtenberg et al. |
| 2009/0313584 A1 | 12/2009 | Kerr et al. |
| 2009/0327019 A1 | 12/2009 | Addae et al. |
| 2009/0327425 A1 | 12/2009 | Gudipaty |
| 2010/0031152 A1 | 2/2010 | Villaron et al. |
| 2010/0037151 A1 | 2/2010 | Ackerman et al. |
| 2010/0058201 A1 | 3/2010 | Harvey et al. |
| 2010/0079467 A1 | 4/2010 | Boss et al. |
| 2010/0095198 A1 | 4/2010 | Bultrowicz et al. |
| 2010/0097331 A1 | 4/2010 | Wu |
| 2010/0131868 A1 | 5/2010 | Chawla et al. |
| 2010/0138756 A1 | 6/2010 | Saund et al. |
| 2010/0149307 A1 | 6/2010 | Iyer et al. |
| 2010/0235216 A1 | 9/2010 | Hehmeyer et al. |
| 2010/0235763 A1 | 9/2010 | Massand |
| 2010/0241968 A1 | 9/2010 | Tarara et al. |
| 2010/0251140 A1 | 9/2010 | Tipirneni |
| 2010/0268705 A1 | 10/2010 | Douglas et al. |
| 2010/0295958 A1 | 11/2010 | Larsson et al. |
| 2010/0306004 A1 | 12/2010 | Burtner et al. |
| 2010/0306018 A1 | 12/2010 | Burtner et al. |
| 2010/0324963 A1 | 12/2010 | Gupta et al. |
| 2011/0107241 A1 | 5/2011 | Moore |
| 2011/0113351 A1 | 5/2011 | Phillips |
| 2011/0137894 A1 | 6/2011 | Narayanan et al. |
| 2011/0154180 A1 | 6/2011 | Evanitsky et al. |
| 2011/0154192 A1 | 6/2011 | Yang et al. |
| 2011/0185288 A1 | 7/2011 | Gupta et al. |
| 2011/0212430 A1 | 9/2011 | Smithmier et al. |
| 2011/0239142 A1 | 9/2011 | Steeves et al. |
| 2011/0282871 A1 | 11/2011 | Seefeld et al. |
| 2011/0295879 A1 | 12/2011 | Logis et al. |
| 2012/0075337 A1 | 3/2012 | Rasmussen et al. |
| 2012/0144325 A1 | 6/2012 | Mital et al. |
| 2012/0150577 A1 | 6/2012 | Berg |
| 2012/0150863 A1 | 6/2012 | Fish |
| 2012/0159355 A1 | 6/2012 | Fish et al. |
| 2012/0166985 A1 | 6/2012 | Friend |
| 2012/0233543 A1 | 9/2012 | Vagell et al. |
| 2013/0035853 A1 | 2/2013 | Stout et al. |
| 2013/0091205 A1 | 4/2013 | Kotler et al. |
| 2013/0091440 A1 | 4/2013 | Kotler et al. |
| 2013/0091465 A1 | 4/2013 | Kikin-Gil et al. |
| 2013/0097544 A1 | 4/2013 | Parker et al. |
| 2013/0101978 A1 | 4/2013 | Ahl et al. |
| 2013/0124978 A1 | 5/2013 | Horns et al. |
| 2013/0125051 A1 | 5/2013 | Kelley et al. |
| 2013/0132886 A1 | 5/2013 | Mangini |
| 2013/0246903 A1 | 9/2013 | Mukai |
| 2014/0032481 A1 | 1/2014 | Lang |
| 2014/0033088 A1 | 1/2014 | Shaver |
| 2014/0207867 A1 | 7/2014 | Kotler et al. |

FOREIGN PATENT DOCUMENTS

| | | |
|---|---|---|
| CN | 101363739 | 2/2009 |
| CN | 101364886 | 2/2009 |
| CN | 101515226 | 8/2009 |
| CN | 101789871 | 7/2010 |
| EP | 1517260 | 3/2005 |
| JP | 04257046 | 9/1992 |
| JP | 2010176320 | 8/2010 |
| RU | 2005139793 | 6/2007 |
| WO | WO-02061682 | 8/2002 |
| WO | WO-2007092470 | 8/2007 |

OTHER PUBLICATIONS

"Non Final Office Action", U.S. Appl. No. 12/486,762, (Oct. 14, 2011), 24 pages.

(56) References Cited

OTHER PUBLICATIONS

"Online Calendar & Group Scheduling", *MOSAIC Technologies*, retrieved from <http://www.webexone.com/Brandded/ID.asp?brandid=2348&pg=%20AppCalendar> on Apr. 24, 2009, 4 pages.

Ju, Wendy et al., "Where the Wild Things Work: Capturing Shared Physical Design Workspaces", *Stanford University*, CSCW '04, (Nov. 6-10), pp. 533-541.

"Final Office Action", U.S. Appl. No. 12/486,762, (Feb. 8, 2012),28 pages.

"Adobe Connect", Retrieved from: <http://www.adobe.com/acom/connectnow/> on Oct. 11, 2010, (Sep. 16, 2010), 3 pages.

"Adobe ConnectNow", Retrieved from: <http://www.adobe.com/acom/connectnow/> on Oct. 13, 2010, 6 pages.

"Description for SharePoint Meeting Manager", Retrieved from: <http://www.softpicks.net/software/Business/Project-Management/SharePoint-Meeting-Manager-47146.htm> on Oct. 11, 2010, (Jul. 27, 2009), 2 pages.

"GoToMeeting", Retrieved from: <http://www.gotomeeting.com/fec/online_meeting> on Oct. 11, 2010, 1 page.

"Meet mimio—The Digital Meeting Assistant", *Mayflower Business Systems Limited*; http://www.kda.co.uk/mimio1/whitepaper.html, (May 1999), 10 pages.

"Meeting Center, Using Video in Your Meetings", retrieved from http://www.oucs.ox.ac.uk/webex/Windows/Video.pdf on May 13, 2009; Cisco webex, 2 pages.

"Meeting Management Software", Retrieved from: <http://workingsmarter.typepad.com/my_weblog/2004/12/meeting_managem.html> on Oct. 11, 2010, (Dec. 10, 2004), 2 pages.

"Microsoft® Office Live Meeting Feature Guide", *Microsoft Corporation*, Available at <http://download.microsoft.com/download/8/0/3/803f9ba6-5e12-4b40-84d9-d8a91073e3dc/LiveMeeting.doc>,(Jan. 2005), pp. 1-17.

"Non-Final Office Action", U.S. Appl. No. 12/473,206, (May 19, 2011), 28 pages.

Adams, Lia et al., "Distributed Research Teams: Meeting Asynchronously in Virtual Space", *Institute of Electrical and Electronics Engineers*, (1999), 17 pages.

Bell, David et al., "Sensory Semantic User Interfaces (SenSUI)(position paper)", *Fluidity Research Group*; Brunel University, (Oct. 20, 2009), 14 pages.

Bunzel, Tom "Using Quindi Meeting Capture", retrieved from http://www.informit.com/guides/content.aspx?g=msoffice&seqNum=220, (Sep. 1, 2006), 3 pages.

Fruchter, Renate "Brick & Bits & Interaction (BBI)", http://www.ii.ist.i.kyoto-u.ac.jp/sid/sid2001/papers/positions/bricksbitsinteraction.pdf, (2001), 4 pages.

Ionescu, Arna et al., "Workspace Navigator: Tools for Capture, Recall and Reuse using Spatial Cues in an Interactive Workspace", *Stanford Technical Report TR2002-04*, http://bcj.stanford.edu/research/wkspcNavTR.pdf, (2002), 16 pages.

Karlson, Amy et al., "Courier: A Collaborative Phone-Based File Exchange System", *Technical Report; MSR-TR-2008-05; Microsoft Research*, (Jan. 2008), 17 pages.

Kim, Hyun H., et al., "SmartMeeting: CMPT 481/811 Automatic Meeting Recording System", http://www.cs.usask.ca/grads/hyk564/homePage/811/CMPT%20811%20final.doc, (2004), 7 pages.

Mitrovic, Nikola et al., "Adaptive User Interface for Mobile Devices", retrieved from http://citeseerx.ist.psu.edu/viewdoc/download?doi=10.1.1.140.4996&rep=rep1&type=pdf, (2002), 15 pages.

Rudnicky, Alexander I., et al., "Intelligently Integrating Information from Speech and Vision to Perform Light-weight Meeting Understanding", retrieved from http://citeseerx.ist.psu.edu/viewdoc/download?doi=10.1.1.126.1733&rep=rep1&type=pdf, (Oct. 2005), 6 pages.

Werle, Patrik et al., "Active Documents Supporting Teamwork in a Ubiquitous Computing Environment", *The Research Group on Ubiquitous Computing*; Department of Computer and Systems Sciences; KTH Center for Wireless Systems; retreived from http://citeseerx.ist.psu.edu/viewdoc/summary?doi=10.1.1.157.4661, (2001), 4 pages.

Yu, Shoou-Jong et al., "Who Said What When? Capturing Important Moments of a Meeting", retrieved from http://repository.cmu.edu/cgi/viewcontent.cgi?article=1003&context=silicon_valley; *Technical Report*, (Apr. 10-15, 2010), 7 pages.

Zenghong, Wu et al., "Context Awareness and Modeling in Self-Adaptive Geo-Information Visualization", retreived from http://icaci.org/documents/ICC_proceedings/ICC2009/html/refer/17_1.pdf on Aug. 30, 2010, 13 pages.

Watson, Richard., "What is mobile presence?", Retrieved at << http://reseller.tmcnet.com/topics/unified-communications/articles/54033-what-mobile-presence.htm >>, Apr. 10, 2009, pp. 3.

"Microsoft Office Communicator 2007 getting started guide", Retrieved at << http://www.ittdublin.ie/media/Media,22233,en.pdf >>, Jul. 2007, pp. 77.

Peddemors, et al., "Presence, location and instant messaging in a contextaware application framework", Retrieved at << http://citeseerx.ist.psu.edu/viewdoc/download?doi=10.1.1.98.3321&rep=rep1&type=pdf >>, 4th International Conference on Mobile Data Management, MDM, 2003, pp. 1-6.

"Cisco context-aware mobility solution: presence applications", Retrieved at << https://www.cisco.com/en/US/solutions/collateral/ns340/ns394/ns348/ns788/brochure_c22-497557.html >>, Retrieved Date: Sep. 7, 2010, pp. 7.

"Tag presence alerts for groups and meeting", filed Jun. 18, 2009, U.S. Appl. No. 12/486,762, pp. 20.

"Final Office Action", U.S. Appl. No. 12/965,965, (Nov. 8, 2012), 12 pages.

"Final Office Action", U.S. Appl. No. 12/978,308, (Apr. 9, 2013), 21 pages.

"Non-Final Office Action", U.S. Appl. No. 12/486,762, (Feb. 14, 2013), 29 pages.

"Non-Final Office Action", U.S. Appl. No. 12/965,965, (Jun. 4, 2012),12 pages.

"Non-Final Office Action", U.S. Appl. No. 12/978,308, (Aug. 31, 2012), 17 pages.

"Final Office Action", U.S. Appl. No. 12/486,762, (Jun. 20, 2013), 42 pages.

"Non-Final Office Action", U.S. Appl. No. 12/967,497, (Jun. 20, 2013), 19 pages.

Bergmann, et al., "Automated Assistance for the Telemeeting Lifecycle", *Proceedings of the ACM conference on Computer supported cooperative work*, (Oct. 1994), pp. 373-384.

"Foreign Office Action", CN Application No. 201110436306.8, Feb. 8, 2014, 13 Pages.

"Non-Final Office Action", U.S. Appl. No. 12/968,287, Mar. 27, 2014, 18 pages.

"An Overview of Aabel 3Features", Retreived From: http://www.gigawiz.com/aabel3.html, Aug. 9, 2011, 21 pages.

"Aquatic Sugar: The Children's Interface, Translated for Adults", Retrieved From: http://www.olpcnews.com/software/operating_system/aquatic_sugar_childrens_interface.html, Nov. 7, 2007, 5 Pages.

"Collaboration within the Telepresence Experience", Retrieved From: http://www.wrplatinum.com/downloads/11056.aspx, Jan. 2010, 11 Pages.

"CounterPoint User Manual", Retrieved From: http://www.cs.umd.edu/hcil/counterpoint/, 2005, 21 pages.

"CounterPoint: A Zooming Presentation Tool", Retrieved From: http://web.archive.org/web/20050205082738/www.cs.umd.edu/hcil/counterpoint/, Feb. 5, 2005, 3 Pages.

"Create Treemaps Using Easy Drag-and-drop Interactions", Retrieved From: http://www.magnaview.nl/treemap/, 2010, 1 page.

"CSS Max-width Property", Retrieved From: http://web.archive.org/web/20070608101036/http://www.w3schools.com/, 2007, 1 page.

"Datapoint version 1.1", Retrieved From: http://www.filedudes.com/DataPoint-download-20853.html, 1997-2007, 2 Pages.

"Extended European Search Report", EP Application No. 09803312.9, Jul. 7, 2011, 6 pages.

"Final Office Action", U.S. Appl. No. 11/260,515, Feb. 24, 2011, 14 pages.

(56) References Cited

OTHER PUBLICATIONS

"Final Office Action", U.S. Appl. No. 11/260,515, Dec. 11, 2009, 19 pages.
"Final Office Action", U.S. Appl. No. 12/184,174, Sep. 6, 2011, 20 pages.
"Final Office Action", U.S. Appl. No. 12/184,174, Nov. 20, 2012, 20 pages.
"Final Office Action", U.S. Appl. No. 12/472,101, Mar. 28, 2012, 16 pages.
"Final Office Action", U.S. Appl. No. 12/967,497, Dec. 3, 2013, 20 pages.
"Final Office Action", U.S. Appl. No. 13/272,832, Dec. 30, 2013, 18 Pages.
"Foreign Office Action", CN Application No. 200980131157.5, Aug. 31, 2012, 7 pages.
"Foreign Office Action", CN Application No. 200980131157.5, Jan. 30, 2013, 7 pages.
"Foreign Office Action", CN Application No. 200980131157.5, Jul. 23, 2013, 8 pages.
"Foreign Office Action", CN Application No. 200980131157.5, Nov. 21, 2013, 11 pages.
"Foreign Office Action", CN Application No. 201110436593.2, Jan. 6, 2014, 11 Pages.
"Free PhotoMesa 3.1.2 (Windows)", Retrieved From: https://web.archive.org/web/20071209231951/http://www.windsorinterfaces.com/photomesa.shtml, 2007, 2 Pages.
"FREEPATH—EDU Nonlinear Presentation Software", Grass Roots Software, 2008, 3 pages.
"GeoTime", Retrieved at: https://web.archive.org/web/20101219085705/http://www.geotime.com/Product/GeoTime-%281%29/Features---Benefits.aspx, 2009, 10 pages.
"Human and Technical Factors of Distributed Group Drawing Tools", Retrieved From: http://grouplab.cpsc.ucalgary.ca/grouplab/uploads/Publications/Publications/1992-HumanTech.IWC.pdf, 1992, 29 Pages.
"Meeting Center Using Video in Your Meetings", Retrieved From: http://www.oucs.ox.ac.uk/webex/Windows/Video.pdf, May 13, 2009, 2 Pages.
"Mindshift Innovation", Retrieved From: http://mindshiftinnovation.blogspot.com/2007/09/seadragon.html, Oct. 4, 2007, 2 Pages.
"Non-Final Office Action", U.S. Appl. No. 11/260,515, Mar. 3, 2009, 16 pages.
"Non-Final Office Action", U.S. Appl. No. 11/260,515, Sep. 30, 2010, 17 pages.
"Non-Final Office Action", U.S. App. No. 12/184,174, Feb. 4, 2011, 16 pages.
"Non-Final Office Action", U.S. Appl. No. 12/184,174, Mar. 13, 2012, 19 pages.
"Non-Final Office Action", U.S. Appl. No. 12/184,174, Sep. 25, 2013, 16 pages.
"Non-Final Office Action", U.S. Appl. No. 12/472,101, Oct. 5, 2011, 15 pages.
"Non-Final Office Action", U.S. Appl. No. 12/965,965, Jun. 4, 2012, 12 pages.
"Non-Final Office Action", U.S. Appl. No. 12/965,965, Dec. 20, 2013, 16 pages.
"Non-Final Office Action", U.S. Appl. No. 13/253,886, Apr. 11, 2013, 13 pages.
"Non-Final Office Action", U.S. Appl. No. 13/272,832, Aug. 12, 2013, 15 pages.
"ProShow Producer Feature Overview", Photodex Corporation: http://www.photodex.com/products/producer/features.html, 2008, 2 pages.
"The Beginner's Guide to Data Visualization", Retrieved From: http://www.tableausoftware.com/beginners-data-visualization, 2010, 10 Pages.
"Visualize and Map SalesForce Leads with SpatiaiKey", Retrieved From: http://web.archive.org/web/20101120170237/http://www.spatialkey.com/support/tutorials/visualize-and-map-salesforce-leads-with-spatialkey-part-ii, 2010, 7 Pages.

"ZuiPrezi Nonlinear Presentation Editor", ZuiPrezi Ltd., http://zuiprezi.kibu.hu/, 2007, 2 pages.
Derthick, et al.,' "An Interactive Visualization Environment for Data Exploration", Retrieved From: http://www.cs.cmu.edu/~sage/KDD97.html, Aug. 1997, 10 Pages.
"International Search Report and Written Opinion", Application No. PCT/US2009/046529, Nov. 30, 2009, 11 Pages.
Fernando, et al.,' "Narrowcasting Attributes for Presence Awareness in Collaborative Virtual Environments pdf", http://ieeexplore.ieee.org/stamp/stamp.jsp?tp=&arnumber=4019930, 2006, 6 pages.
Geyer, et al.,' "Activity Explorer: Activity-centric Collaboration from Research to Product", IBM Systems Journal, IBM® Retrieved From: http://www.research.ibm.com/journal/sj/454/geyer.html., 2006, 26 Pages.
Good, et al.,' "CounterPoint: Creating Jazzy Interactive Presentations", Retrieved From: http://drum.lib.umd.edu/bitstream/1903/1121/2/CS-TR-4225.pdf, 2001-2003, 9 Pages.
Hewagamage, "Interactive Visualization of Spatiotemporal Patterns Using Spirals on a Geographical Map", Proc. IEEE Symp. Visual Languages, 1999, 8 pages.
Hupfer, "Introducing Collaboration into an Application Development Environment", Retrieved From: http://pnexpert.com/files/IBM_Contextual_Collaboration.pdf, Nov. 6-10, 2004, 4 Pages.
Izadi, et al.,' "Dynamo: A public interactive surface supporting the cooperative sharing and exchange of media", Retrieved From: http://research.microsoft.com/pubs/132613/p159-izadi.pdf, 2003, 10 Pages.
Little, "High-End Business Intelligence with Data Visualization for WPF 4", Retrieved From: http://www.codeproject.com/Articles/90591/High-End-Business-Intelligence-with-Data-Visualization, Jun. 29, 2010, 7 Pages.
Moran, et al.,' "Tailorable Domain Objects as Meeting Tools for an Electronic Whiteboard", Retrieved From: http://pdf.aminer.org/000/121/871/tailorable_domain_objects_as_meeting_tools_for_an_electronic_whiteboard.pdf, 1998, 10 Pages.
Nelson, "Just Around the Corner: Visual Fusion 4.5", Retrieved From: http://www.idvsolutions.com/Company/Newsletters/2009/Q3/Vfx45Silverlight.aspx, Sep. 30, 2009, 6 Pages.
Shaw, "Create Pan andd Zoom Effects in PowerPoint", Retrieved From: http://office.microsoft.com/en-us/powerpoint-help/create-pan-and-zoom-effects-in-powerpoint-HA010232631.aspx, 2007, 13 Pages.
Thomas, et al.,' "Through-Walls Collaboration", Retrieved From: http://www.tinmith.net/papers/piekarski-pervasive-2009.pdf, 2009, 8 Pages.
Wempen, "PowerPoint 2007 Bible", John Wiley & Sons, Feb. 27, 2007, 27 pages.
Weverka, "PowerPoint 2007 All-in-One Desk Reference for Dummies", Published by Wiley Publishing, Jan. 2007, 8 pages.
"Final Office Action", U.S. Appl. No. 12/965,965, Jun. 5, 2014, 13 pages.
"Final Office Action", U.S. Appl. No. 12/968,287, Jun. 6, 2014, 19 pages.
"Foreign Notice of Allowance", RU Application No. 2011103151, Sep. 4, 2013, 18 pages.
"Final Office Action", U.S. Appl. No. 13/253,886, Feb. 14, 2014, 26 Pages.
"Non-Final Office Action", U.S. Appl. No. 12/473,206, Jul. 31, 2014, 41 pages.
"Foreign Office Action", CN Application No. 201110436635.2, Nov. 27, 2014, 11 pages.
"Foreign Office Action", CN Application No. 201110436306.8, Nov. 15, 2014, 7 pages.
"Foreign Office Action", CN Application No. 201110443291.8, Nov. 21, 2014, 8 pages.
"Final Office Action", U.S. Appl. No. 12/184,174, Aug. 11, 2014, 18 pages.
"Foreign Office Action", CN Application No. 201110436306.8, Sep. 17, 2014, 7 Pages.
"Foreign Office Action", CN Application No. 201110436593.2, Sep. 12, 2014, 12 Pages.
"Foreign Office Action", CN Application No. 201110436635.2, May 27, 2014, 14 pages.

(56) References Cited

OTHER PUBLICATIONS

"Foreign Office Action", CN Application No. 201110443291.8, Jan. 24, 2014, 12 Pages.

"Foreign Office Action", CN Application No. 201110443291.8, Jul. 24, 2014, 10 Pages.

"Non-Final Office Action", U.S. Appl. No. 12/472,101, Sep. 16, 2014, 10 pages.

"Non-Final Office Action", U.S. Appl. No. 12/965,965, Oct. 2, 2014, 14 pages.

"Non-Final Office Action", U.S. Appl. No. 13/253,886, Aug. 14, 2014, 15 pages.

"Non-Final Office Action", U.S. Appl. No. 14/225,234, Jul. 18, 2014, 5 pages.

"Final Office Action", U.S. Appl. No. 12/965,965, Mar. 11, 2015, 17 pages.

"Final Office Action", U.S. Appl. No. 12/968,287, Jun. 5, 2015, 21 pages.

"Foreign Notice of Allowance", CN Application No. 201110436306.8, Apr. 1, 2015, 4 Pages.

"Foreign Office Action", CN Application No. 201110436593.2, Mar. 16, 2015, 7 Pages.

"Foreign Office Action", CN Application No. 201110436635.2, May 18, 2015, 14 Pages.

"Non-Final Office Action", U.S. Appl. No. 12/473,206, Apr. 9, 2015, 55 pages.

"Non-Final Office Action", U.S. Appl. No. 12/967,497, Mar. 13, 2015, 21 pages.

"Non-Final Office Action", U.S. Appl. No. 12/968,287, Mar. 27, 2015, 18 pages.

Pash,"Google Docs Updates with a Drawing Editor, Real-Time Collaboration, and Speed", Retrieved from <http://lifehacker.com/5513760/google-docs-updates-with-a-drawing-editor-real-time-collaboration-and-speed> on Jun. 8, 2015, Jun. 5, 2015, 17 pages.

"Final Office Action", U.S. Appl. No. 12/967,497, Jul. 2, 2015, 24 pages.

"Foreign Notice of Allowance", CN Application No. 201110436593.2, Jun. 4, 2015, 6 Pages.

\* cited by examiner

MEETING-SPECIFIC STATE INDICATORS

BACKGROUND

Various types of computer programs allow a user to share data describing their current state with other users. For instance, a user of an instant messaging ("IM") client application might manually specify their current state as "bus." The specified state may then be communicated to other IM users.

A user's state might also be set automatically. For instance, an IM client might automatically update a user's state based on activity or inactivity detected at the user's computer, in another example, a user's calendar might be utilized to automatically set the user's state to "in a meeting" during the time a meeting is scheduled on the user's calendar.

Conventional indicators of a user's current state ("state indicators") communicate only a very general notion of the current state of a user. For instance, conventional general-purpose state indicators typically include "online", "busy", "offline", "in a meeting", and other similarly general phrases.

The conventional general-purpose state indicators "busy" and "in a meeting" are helpful to people outside of a meeting. However, these general-purpose state indicators provide little information for invitees to the same meeting. For invitees to the same meeting, the "busy" and "in a meeting" general-purpose state indicators may be unhelpful and even misleading, especially if one of the invitees is not actually at the meeting.

It is with respect to these and other considerations that the disclosure made herein is presented.

SUMMARY

Technologies are described herein for providing meeting-specific state indicators. Through an implementation of the concepts and technologies presented herein, meeting-specific state indicators can be provided to users that have been invited to the same meeting. General-purpose state indicators can be provided to users not invited to the meeting. In this manner, more relevant state indicators may be provided to users attended the same meeting.

According to one aspect presented herein, a state client and a state service are configured to provide meeting-specific state indicators. A meeting-specific state indicator is a state indicator that identifies a user's state with respect to a particular meeting and that is shared only with other invitees to the same meeting. A state client is a component configured to display state indicators, such as an IM client or a personal information management ("PIM") program. A state service is a component configured to maintain state data and to make the state data available to state clients. For instance, a stand-alone state service may be configured to provide meeting-specific state indicators. In other embodiments, an IM server or a meeting service may implement the state service.

According to another aspect, a state client is provided that is configured to provide a user interface for allowing a user to specify a meeting-specific state. For instance, the state client might allow a user to specify that the user is late for a meeting, that the user cannot attend the meeting, or that the user has checked in for the meeting. The meeting-specific state indicator might also identify an action that the user is performing at the meeting, such as presenting in the meeting, that the user is a next presenter in the meeting, or that the user is sharing a computer desktop with other meeting attendees. The meeting-specific state indicator might also identify a request by the user, such as that the user has a question or would like a meeting presenter to speed up or slow down. When a user specifies a general-purpose or meeting-specific state indicator, the specified state is transmitted to the state service.

According to another aspect, a state service is provided that is configured to store data identifying the current state of one or more users, including a meeting-specific state. The state service also receives and responds to requests for the state of a user relative to a meeting. For instance, a state client might make a request for the state of a user in a particular meeting. In response to such a request, the state service returns the state of the user in the meeting.

In another embodiment, a state client might make a request on behalf of one user for the state of another user. In response to such a request, the state service determines whether a meeting is in progress, or about to be in progress, for which both users are invitees. The state service might communicate with a meeting service or another type of service to make this determination.

If the state service determines that both users are not invitees to the same meeting, the state service returns a general-purpose state indicator (e.g. "online", "busy", "offline", "in a fleeting") in response to the request. If the state service determines that the users are invitees to the same meeting, the state service returns a meeting-specific state indicator. For instance, as discussed above, the state service might return a meeting-specific state indicator such as "late for the meeting," "cannot attend the meeting," or "checked in." The state client may then display the meeting-specific state indicator. In this manner, more relevant state indicators may be provided to users attended the same meeting.

This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for providing meeting-specific state indicators. As discussed briefly above, a state client is configured to allow a meeting-specific state to be specified. For instance, a user might be permitted to specify that they are running late for a meeting, checked in to the meeting, or unable to attend the meeting. Alternately, the meeting-specific state may be generated automatically, such as for instance in response to a user entering a conference room or joining an audio or video stream of a meeting. A state service stores data identifying the user's meeting-specific state.

The state service disclosed herein also responds to requests for the state of the user. When such a request is received, the state service provides the state for a user with regard to a particular meeting in response to the request. A state client may then display meeting-specific state indicators indicating the user's state with respect to the meeting. The state client might also display general-purpose state indicators.

In another embodiment, the state service determines whether the user is an invitee to the same meeting as a user requesting the state. If not, the state service returns a general-purpose state indicator for the user. If both users are invitees to the same meeting, the state service returns a meeting-specific state indicator, which may then be displayed by a state client. In this way, meeting-specific state indicators can be provided to invitees of the same meeting.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for providing meeting-specific state indicators will be described.

Figure 1A:
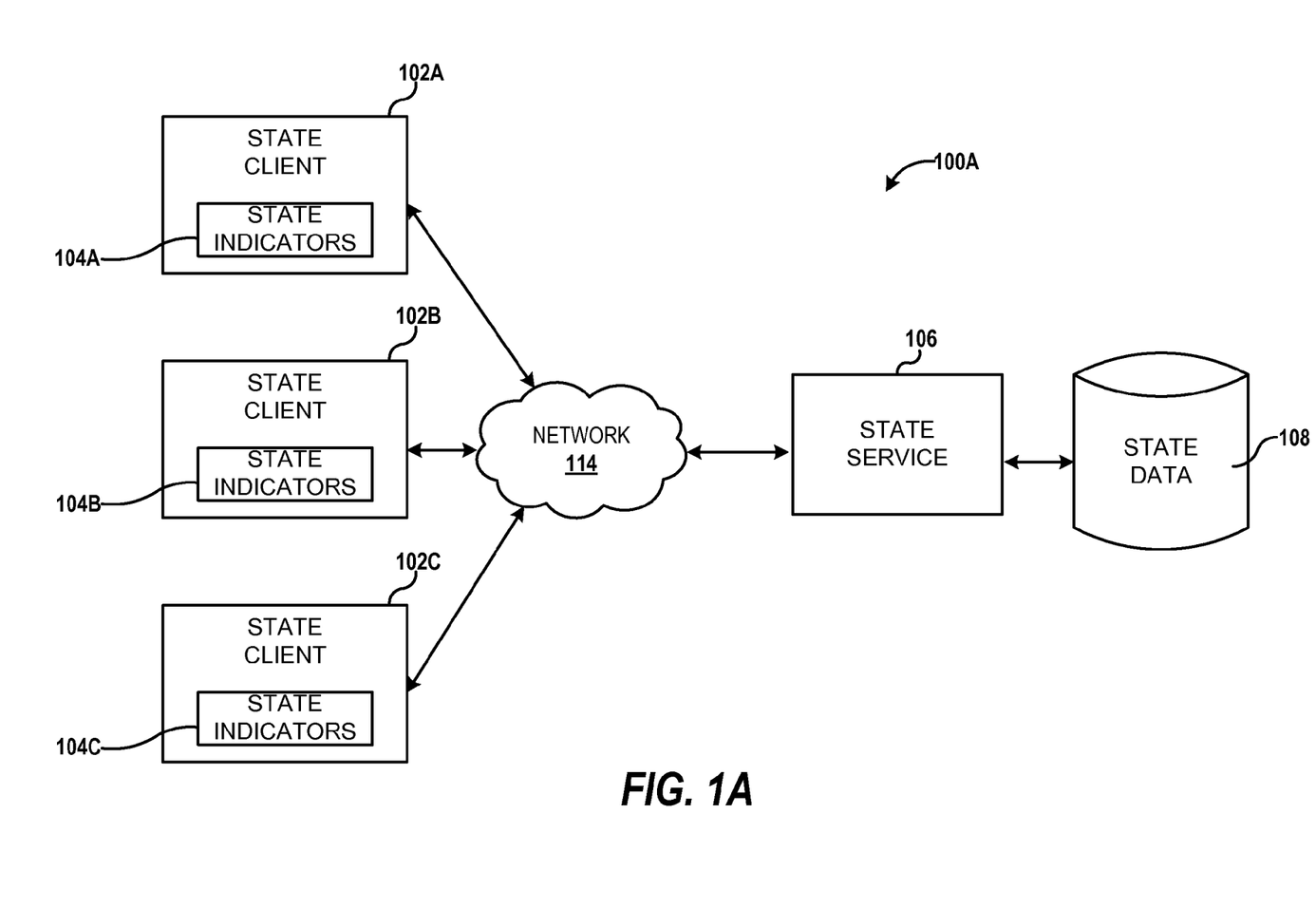
FIGS. 1A-1B are software and network architecture diagrams showing several illustrative operating environments for the embodiments disclosed herein.

FIG. 1A is a software and network architecture diagram showing one illustrative operating environment 100A for the embodiments disclosed herein. The illustrative operating environment 100A shown in FIG. 1 includes a number of state clients 102A-102C, which may be referred to herein individually as "a state client 102" or collectively as "the state clients 102", and a state service 106. The state clients 102 are connected to the state service 106 by way of a network 114.

Each of the state clients 102 is a component configured to display the state indicators 104A-104C. For instance, in one implementation, the state clients 102 are IM client applications configured to display the state indicators 104 for one or more users. Alternatively, the state clients 102 may be PIM programs, such as the OUTLOOK PIM program from MICROSOFT CORPORATION of Redmond, Wash. Alternatively, the state clients 102 might also be programs for editing and/or presenting documents. For instance, the state clients 102 may be word processing applications, presentation applications, spreadsheet applications, and other types of applications. It should be appreciated that, in general, the state clients 102 may be any type of component configured to display the state indicators 104.

The state indicators 104 are visual indications that specify the state of a person. For instance, in one implementation where the state client 102A is an IM program, the state indicators 104 may be user interface ("UI") elements that show the state of one or more people. The state indicators 104 might also comprise other types of graphical, audible, and audio/visual indicators that indicate the state of a person.

As discussed briefly above, the state clients 102 are connected to the state service 106 by way of the network 114. The state service 106 is a component configured to maintain state data 108 and to make the state data 108 available to the state clients 102. The state data 10$ is data that identifies the state of one or more people. For instance, according to various implementations, each of the state clients 102A-102C may transmit data indicating the state of an associated user to the state service 106. In turn, the state service 106 stores the received information as the state data 108.

As will also be described in greater detail below, the state service 106 responds to requests from the state clients 102, for the state data 108. In this manner, each of the state clients 102A-102C can provide state indicators 104 for an associated group of users. Although the state service 106 is illustrated in FIG. 1A as a stand-alone service, the state service 106 might also be implemented by an IM server, a PIM server program, such as the EXCHANGE PIM server program from MICROSOFT CORPORATION, or by another component. As will be described in greater detail below with regard to FIG. 1B, the state service 106 might also be implemented in conjunction with a meeting service.

As will be described in greater detail below, the state clients 102 disclosed herein are configured to provide a UI for allowing a user to specify a meeting-specific state. For instance, the state clients 102 might allow a user to specify a meeting-specific state indicator 104, such as an indication that the user is late for a meeting, the user cannot attend the meeting, or that the user has checked in for the meeting. The meeting-specific state indicator 104 might also identify an action that the user is performing at the meeting, such as presenting in the meeting, that the user is a next presenter in the meeting, or that the user is sharing a computer desktop with other meeting attendees. Meeting-specific state indicators 104 might also identify a request by the user such as that the user has a question, would like a meeting presenter to speed up or slow down, or would like the presenter to speak more loudly. A meeting-specific state indicator might also be specified automatically, such as when a user enters a meeting room or joins an audio or video broadcast of the meeting.

The state clients 102A-102C illustrated in FIG. 1 may also allow an associated user to specify a general-purpose state indicator. As discussed above, general-purpose state indicators communicate a very general notion of the current state of a user. For instance, general-purpose state indicators typically include an indication that a user is online, busy, offline, or in a meeting. General-purpose state indicators do not provide any indication regarding a user's particular state within a meeting. When a user utilizes a state client 102 to specify a general-purpose or meeting-specific state indicator 104, the specified state is transmitted to the state service 106 and stored as the state data 108.

As also described briefly above, the state service 106 receives and responds to requests from the state clients 102 for the state of users. For example, the state service 106 might response to a request from a state client 102A for the status of a user with respect to a meeting. In response to receiving such a request, the state service 106 identifies the appropriate meeting in the state data 108 and returns the appropriate meeting-specific state in response to the request. For instance, as discussed above, the state service 106 might return a meeting-specific state indicator such as "late for the meeting," "cannot attend the meeting," or "checked in." The state client 102A might then display a state indicator 104A indicating the meeting-specific state of the user.

It should be appreciated that while three state clients 102A-102C have been illustrated in FIG. 1A, the state service 106 might support many other state clients 102. Additionally, although a single network 114 has been disclosed herein, it should be appreciated that many more networks might be utilized to connect the state clients 102 to the state service 106. Moreover, the network 114 described herein may be the Internet, or any suitable local or wide area network configured for connecting a state client 102 and a state service 106. In this regard, it should be generally appreciated that the operating environment 100A shown in FIG. 1A is merely illustrative and that many other implementations might be utilized. For instance, in another embodiment, the state data 108 is stored at the state clients 102. In this embodiment, the state clients 102 are configured to determine when two users are in the same meeting and to display the appropriate meeting-specific state indicator.

Figure 1B:
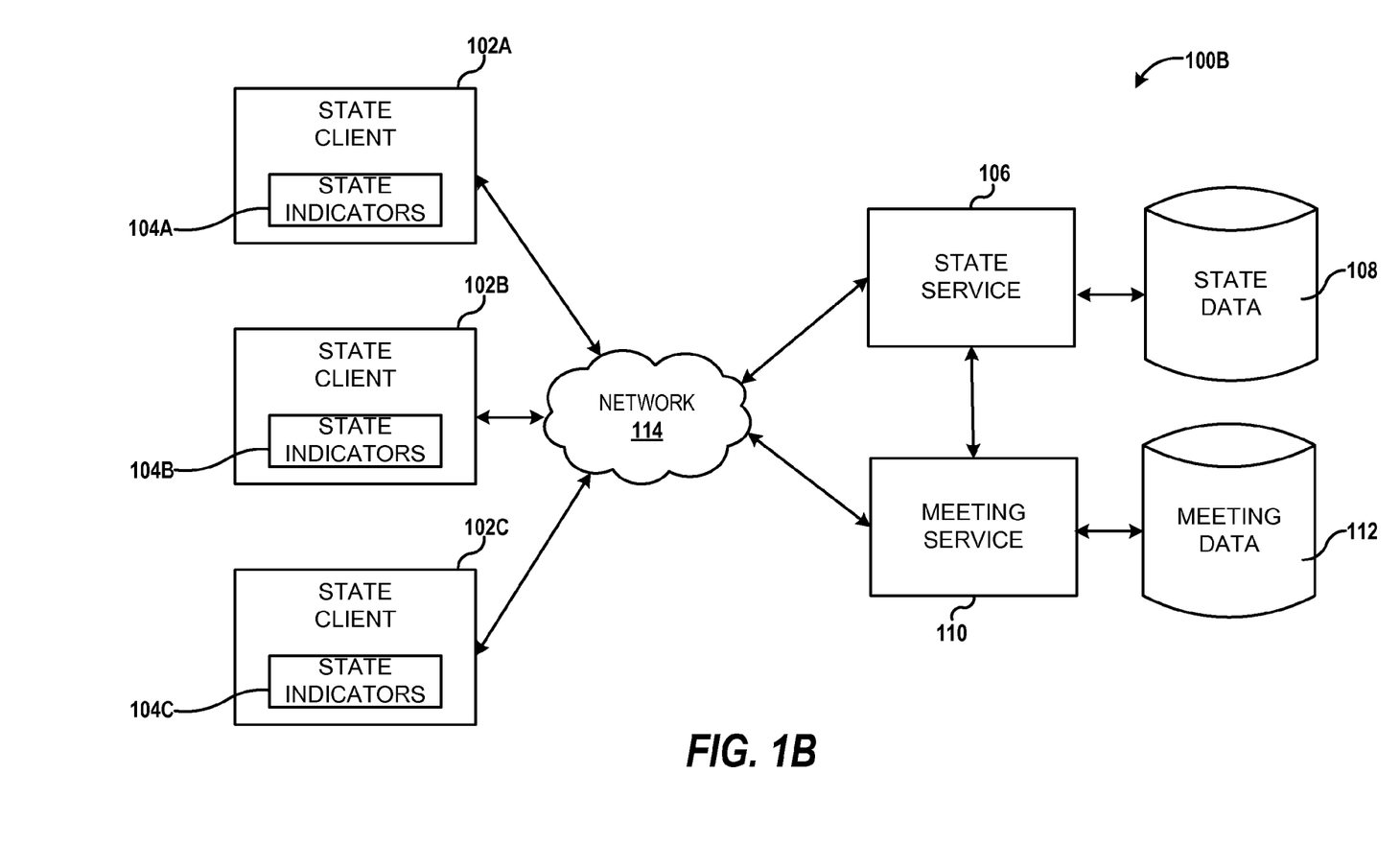

FIG. 1B is a software and network architecture diagram showing another illustrative operating environment 100B for the embodiments disclosed herein. In the embodiment shown in FIG. 1B, the state service 106 operates in conjunction with a meeting service 110. In this example, the state client 102A might make a request on behalf of an associated user for the state of another user. In response to such a request, the state service 106 disclosed herein determines whether a meeting is in progress, or about to be in progress, for which both users are invitees. According to one implementation, the state service 106 communicates with a meeting service 110 to make this determination. The meeting service 110 might store meeting data 112 that defines the time and attendees at one or more meetings. Other mechanisms might also be utilized by the state service 106 to determine whether two users are invitees to the same meeting.

If the state service 106 determines that both risers are not invitees to the same meeting, the state service 106 returns a general-purpose state indicator in response to the request from the state client 102. If the state service 106 determines that the users are invitees to the same meeting, the state service returns a meeting-specific state indicator. The state client 102 that requested the state may then display the meeting-specific state indicator. In this manner, more relevant state indicators 104 may be provided to users attending the same meeting. Users not attending the meeting will be presented with a general-purpose indicator, such as "in a meeting." In alternate embodiments, users are presented with both a meeting-specific and a general-purpose state indicator. Additional details regarding the operation of the state clients 102 and the state service 106 will be described below.

It should be appreciated that while the state service 106 and the meeting service 110 have been illustrated in FIG. 1B as separate components, the functionality provided by these components may be performed by more or fewer components than illustrated in FIG. 1B. For instance, the presence data 108 and the meeting data 112 may be combined into a single database. In this regard, it should be generally appreciated that the operating environment 100B shown in FIG. 1B is merely illustrative and that many other implementations might be utilized.

Figure 2:
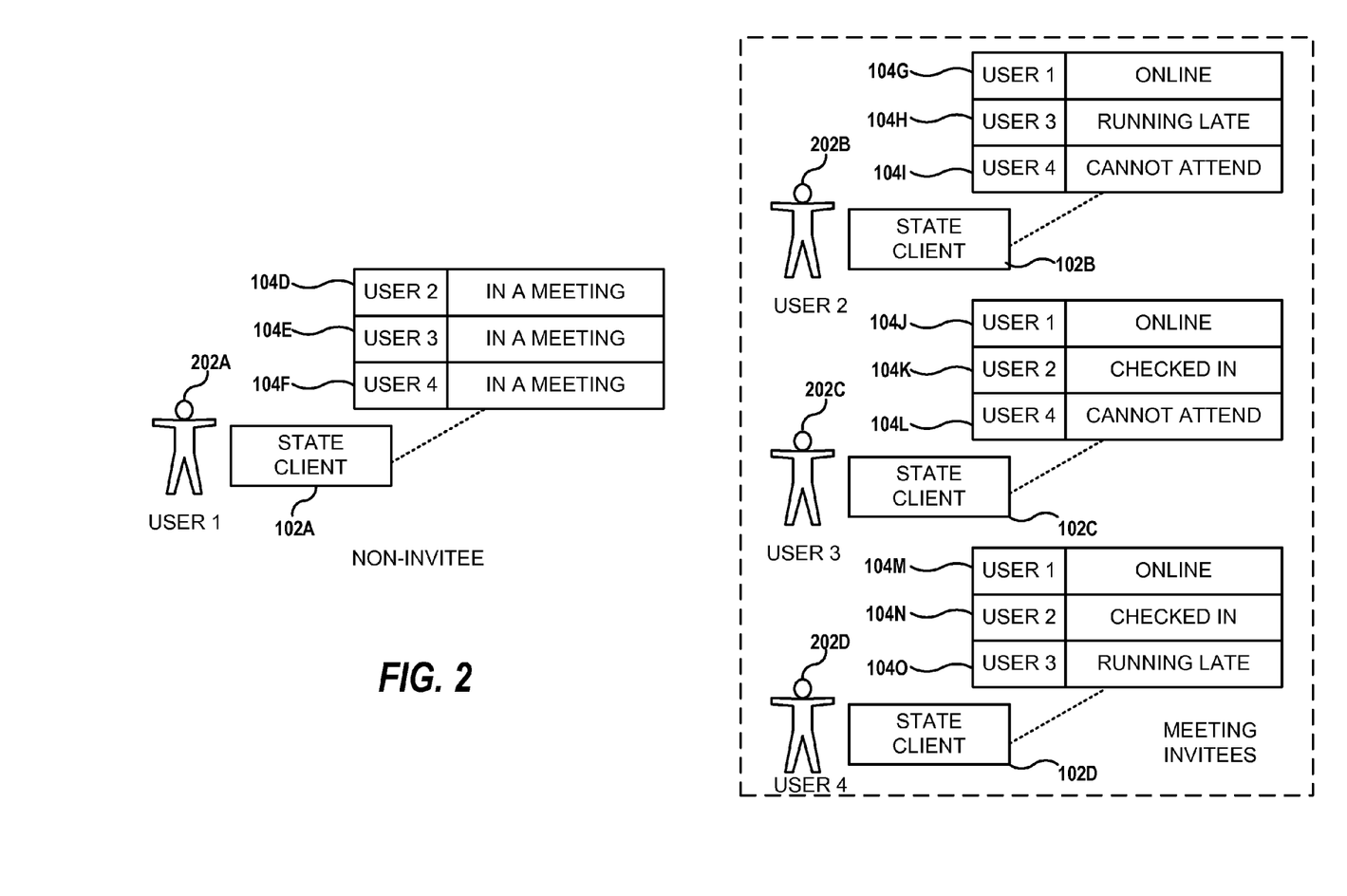
FIG. 2 is a block diagram illustrating aspects of one mechanism disclosed herein for providing meeting-specific state indicators.

FIG. 2 is a block diagram illustrating aspects of one mechanism disclosed herein for providing meeting-specific state indicators. In particular, FIG. 2 illustrates how the state clients 102A-102D are configured to display meeting-specific state indicators 104 for invitees to the same meeting and to display general-purpose state indicators to users that are not meeting invitees. In the example shown in FIG. 2, four users 202A-202D are utilizing the state clients 102A-102D, respectively. The users 202B-202D are invitees to the same meeting. The user 202A has specified a general-purpose state indicator indicating that they are online. The user 202B has specified a general-purpose state indicator specifying that they are in a meeting and a meeting-specific state indicator indicating that they are checked in to the meeting. The user 202C has specified a general-purpose state indicator indicating that they are in a meeting and a meeting-specific state indicator indicating that they are running late for the meeting. The user 202D has specified a general-purpose state indicator indicating that they are in a meeting and a meeting-specific state indicator indicating that they cannot attend the meeting.

Because the user 202A is not a meeting invitee, the state client 102A will only display general-purpose state indicators for the users 202B-202D, in particular, in the example shown in FIG. 2, the state client 102A displays state indicators 104D, 104E, and 104F indicating that the users 202B-202D, respectively, are in a meeting.

The state client 10213 utilized by the user 202B displays a general-purpose state indicator 104G for the user 202A indicating that the user 202A is online. The state client 102B displays meeting-specific state indicators 104H and 104I for the users 202C and 202D indicating that the users are running late and cannot attend the meeting, respectively.

The state client 102C displays a general-purpose indicator 104J for the user 202A indicating that the user is online. The state client 102C displays the meeting-specific state indicators 104K and 104L for the users 202B and 202D, respectively. The meeting-specific state indicator 104K indicates that the user 20213 has checked in to the meeting. The meeting-specific state indicator 1041L indicates that the user 202D cannot attend the meeting.

The state client 102D displays the general-purpose state indicator 104M for the user 202A indicating that the user 202A is online. The state client 102D also displays the meeting-specific state indicators 104N and 104O for the users 202B and 202C, respectively. The meeting-specific state indicator 104N indicates that the user 202B has checked in to the meeting and the meeting-specific state indicator 104O indicates that the user 202C is running late for the meeting.

It should be appreciated that the example shown in FIG. 2 is merely illustrative, it should also be appreciated that the general-purpose state of each of the users 202A-202D may be set manually by a user, such as through a user interface provided by a state client 102, or automatically on behalf of the user, such as by the meeting service 110. It should be further appreciated that although four users 202A-202D have been illustrated in FIG. 2, the technologies and concepts disclosed herein may be utilized with many more or fewer users than illustrated in FIG. 2 and described herein.

Figure 3:
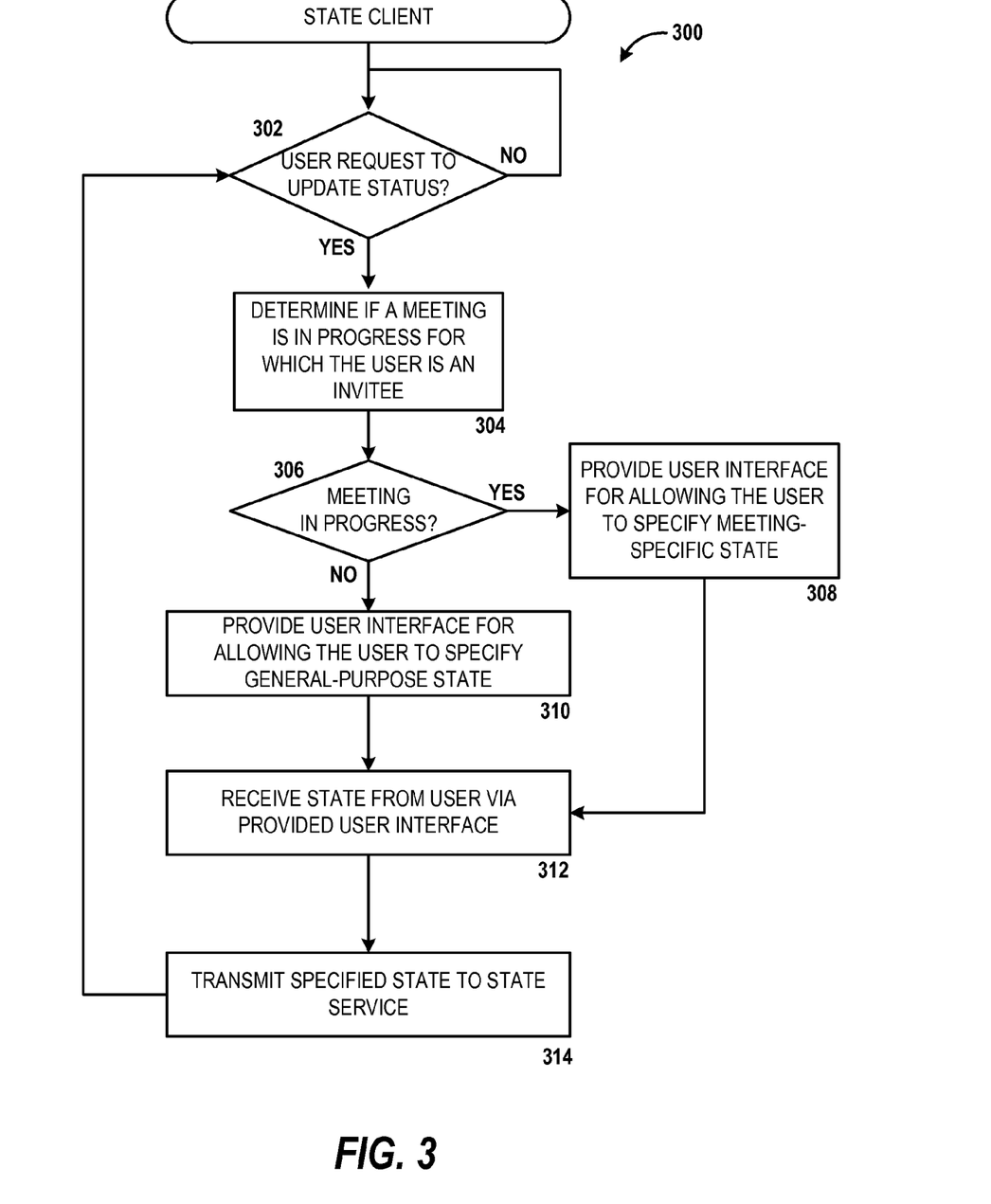
FIG. 3 is a flow diagram showing aspects of the operation of a state client according to one embodiment presented herein for providing meeting-specific state indicators.

FIG. 3 is a flow diagram showing one illustrative routine 300 showing aspects of the operation of the state client 102 according to one embodiment disclosed herein. It should be appreciated that the logical operations described herein with respect to FIG. 3 and the other FIGURES are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 300 begins at operation 302, where the state client 102 determines whether a user has requested to update their state. If a user has not requested to update their state, the routine 300 proceeds to operation 302 where another such determination is made. If the state client 102 determines that a user has requested to update their state, the routine 300 proceeds from operation 302 to operation 304. As discussed above, state might also be updated automatically, such as by a shared computer in a meeting room, by the meeting service 110, in response to a user joining an audio or video feed of a meeting, or in another manner.

At operation 304, the state client 102 determines if a meeting is in progress for which the associated user is an invitee. For instance, the state client 102 might contact the meeting service 110 to determine whether a meeting is in progress or about to be in progress for which the associated user is an invitee. From operation 304, the routine 300 proceeds to operation 306.

If the state client 102 determines that a meeting is in progress, the routine 300 proceeds to operation 308 where the state client 102 provides a user interface for allowing the user to specify their meeting-specific state. One illustrative user interface for specifying a meeting-specific state will be described below with reference to FIG. 4B. From operation 308, the routine 300 proceeds to operation 312.

If the state client 102 determines that a meeting is not in progress, the routine 300 proceeds from operation 306 to operation 310. At operation 310, the state client 102 provides a user interface for allowing the associated user to specify a general-purpose state. An illustrative user interface for specifying a general-purpose state will be described below with reference to FIG. 4A.

From operations 308 and 310, the routine 300 proceeds to operation 312, where the state client 102 receives the general-purpose or meeting-specific state from the user via the provided user interface. The routine 300 then proceeds to operation 314 where the state client 102 transmits the data identifying the specified state to the state service 106. As discussed briefly above, the state service 106 may store the received data as the state data 108. From operation 314, the routine 300 proceeds to operation 302 where a user may update their state in the manner described above.

It should be appreciated that the operation of the state client 102 described in FIG. 3 allows the state client 102 to provide a user interface for specifying a general-purpose state when the user is not in a meeting, and a user interface for specifying a meeting-specific state when the user is in a meeting. It should be appreciated that, in other implementations, the state client 102 might provide a single user interface for providing a general-purpose state and/or a meeting-specific state. A user's state may also be specified automatically, such as by the meeting service 110.

Figure 4A:
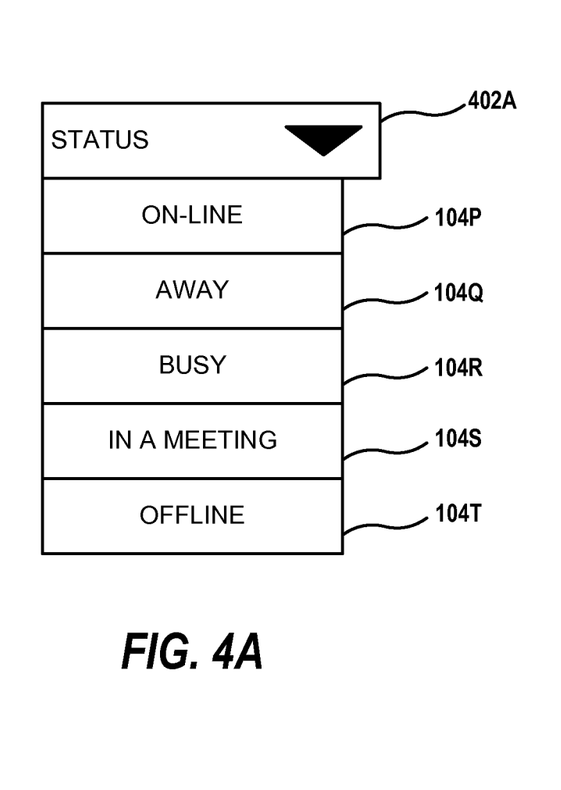
FIGS. 4A-4B are user interface diagrams showing aspects of several illustrative user interfaces generated by a state client according to one embodiment disclosed herein.
Figure 4B:
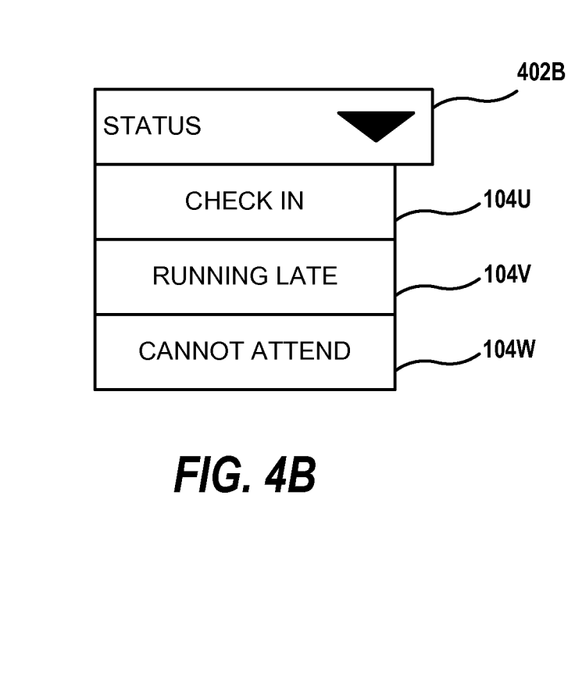

FIGS. 4A-4B are user interface diagrams showing aspects of several illustrative user interfaces generated by a state client 102 according to one embodiment disclosed herein. In particular, FIG. 4A shows a user interface control 402A for specifying a general-purpose state indicator 104P-104T. When the user interface 402A is specified, the state indicators 104P-104T are displayed and may be selected by a user. It should be appreciated that the general-purpose state indicators 104P-104T illustrated in FIG. 4A are merely illustrative and other general-purpose state indicators might be specified by the user interface control 402A. As described briefly above, the user interface control 402A may be displayed by the state client 102A when a user requests to modify their state that is not an invitee to an in-progress meeting.

FIG. 4B shows a user interface control 402B for specifying a meeting-specific state indicator, such as the state indicators 104U-104W. It should be appreciated that, according to embodiments, the user interface control 402B might be utilized to specify other meeting-specific state indicators. For instance, according to one implementation, the user interface control 402B might be utilized to specify a state indicator that identifies an action that a user is performing at a meeting, such as presenting in the meeting, that the user is a next presenter in the meeting, or that the user is currently sharing a computer desktop with other meeting attendees. The user interface control 402B might also allow a user to specify a meeting-specific state indicator that identifies a request by the user, such as that the user has a question or would like a meeting presenter to speed up or slow down.

In other embodiments, a user that specifies the state indicator 104V for indicating that they are running late to a meeting might also be presented with another user interface for providing additional details. For instance, a UI might be presented through which the user can specify a duration of time until they will arrive at the meeting or a free-form comment such as "start without me" or "wait until I get there." A similar UI might also be provided for other states. For instance, if a user indicates that they cannot attend a meeting, a UI might be provided through which the user can specify a text string indicating why they cannot attend. This information is transmitted to the state service 106 in the manner described above and may be displayed along with the state indicators 104.

When a user specifies a general-purpose state indicator utilizing the user interface control 402A or a meeting-specific state indicator utilizing the user interface control 402B, data identifying the specified state indicator is transmitted to the state service 106 and stored in the state data 108. Subsequently, when a state client 102 requests the state of a user, the data stored by the state service 106 may be retrieved, provided to the requesting state client 102, and utilized to display a meeting-specific or general-purpose state indicator. Additionally details regarding the operation of the state service 106 in this regard will be provided below with respect to FIG. 5.

It should be appreciated that the user interfaces shown in FIGS. 4A-4B are merely illustrative and that other types of user interfaces might be utilized. As also discussed above, the current state of a user may be specified in ways other than through the use of the user interface controls 402A-402B. For instance, the state client 102 may specify the current state of the user based upon detected inactivity. Alternately, the meeting service 110 or another component might also specify the current state of a user to the state service 106.

Figure 5:
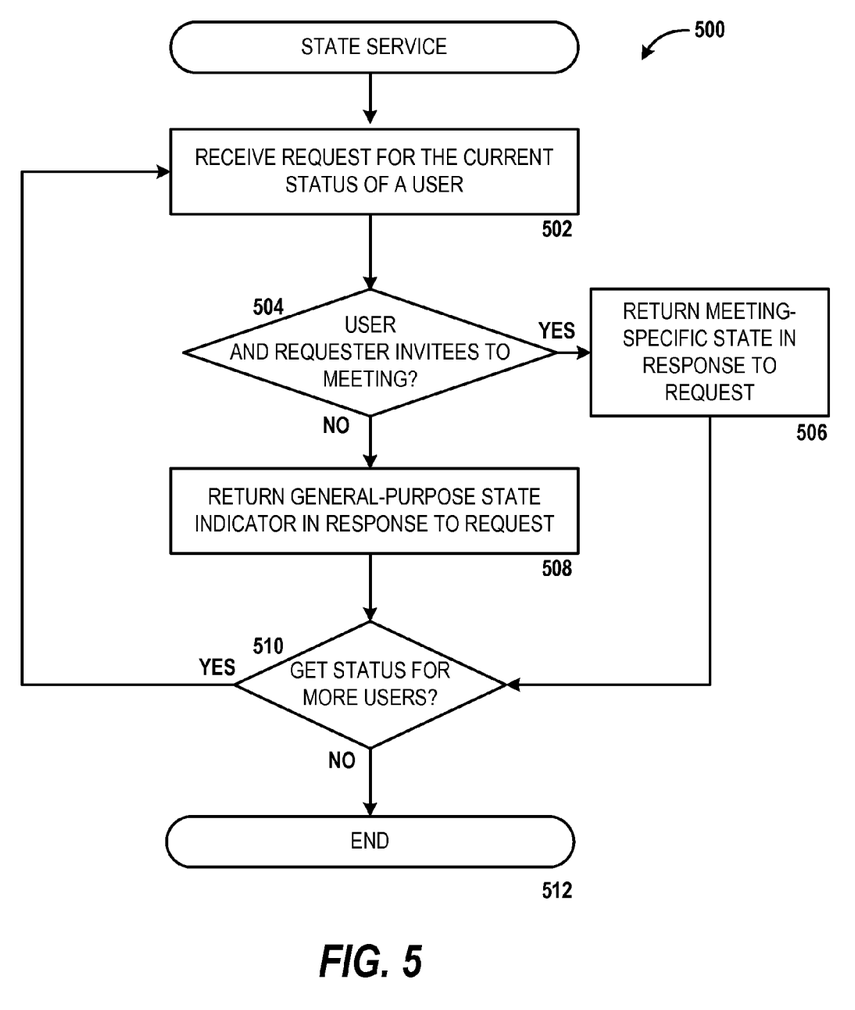
FIG. 5 is a flow diagram showing aspects of the operation of a state service according to one embodiment presented herein for providing meeting-specific state indicators.

FIG. 5 is a flow diagram showing aspects of the operation of a state service 106 according to one embodiment presented herein for providing meeting-specific state indicators. The routine 500 begins at operation 502 where the state service 106 receives a request from a state client 102 for the current state of a user. In response to receiving such a request, the routine 500 proceeds from operation 502 to operation 504 where the state service 106 determines whether the user for which the state was requested and the user requesting the state are invitees to the same meeting. As discussed above, the state service 106 might utilize a meeting service 110 to make such a determination.

If the state service 106 determines that a meeting is in progress for which both the user for which state was requested and the user requesting state are invitees, the routine 500 proceeds to operation 506. At operation 506, the state service 106 returns the meeting-specific state of the user for which state was requested to the requesting state client 102. If, at operation 504, the state service 106 determines that a meeting is not in progress for which the requesting user and the user for which state was requested are invitees, the routine 500 proceeds to operation 508. At operation 508, the state service 106 returns a general-purpose state indicator 104 for the user for which state was requested in response to the request from the state client 102.

From operations 506 and 508, the routine 500 proceeds to operation 510. At operation 510, the state service 106 determines whether state has been requested for more users. If so, the routine 500 proceeds to operation 502 where the request for a user's state is processed in the manner described above. If not, the routine 500 proceeds from operation 510 to operation 512, where it ends.

Figure 6:
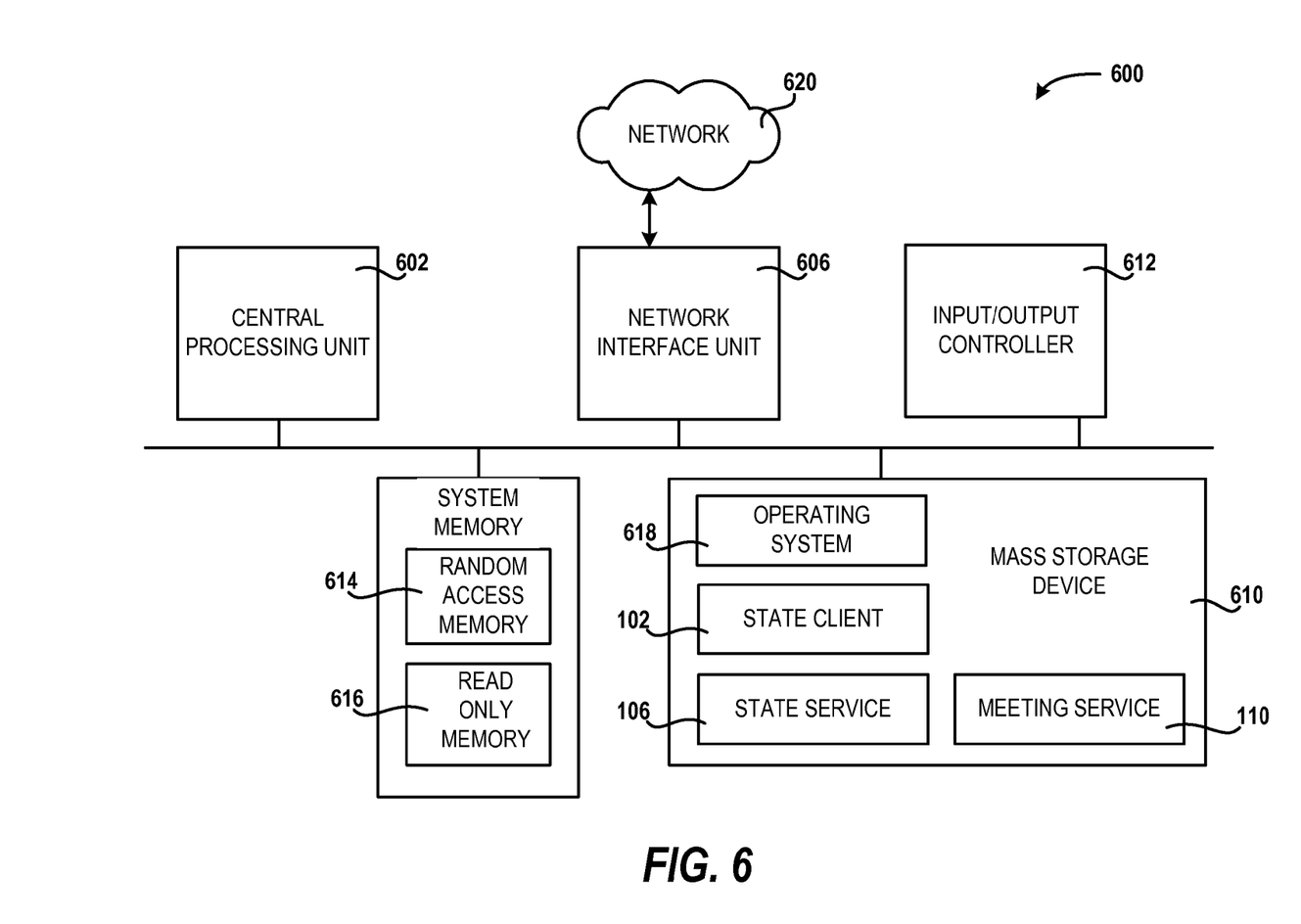
FIG. 6 is a computer architecture diagram showing an illustrative computer hardware and software architecture for a computing system capable of implementing the various embodiments presented herein.

FIG. 6 is a computer architecture diagram showing an illustrative computer hardware and software architecture for a computing system capable of implementing the various embodiments presented herein. The computer architecture shown in FIG. 6 illustrates a conventional desktop, laptop computer, or server computer and may be utilized to execute the various software components described herein.

The computer architecture shown in FIG. 6 includes a central processing unit 602 ("CPU"), a system memory 608, including a random access memory 614 ("RAM") and a read-only memory ("ROM") 616, and a system bus 604 that couples the memory to the CPU 602. A basic input/output system ("BIOS") containing the basic routines that help to transfer information between elements within the computer 600, such as during startup, is stored in the ROM 616. The computer 600 further includes a mass storage device 610 for storing an operating system 618, application programs, and other program modules, which will be described in greater detail below.

The mass storage device 610 is connected to the CPU 602 through a mass storage controller (not shown) connected to the bus 604. The mass storage device 610 and its associated computer-readable storage media provide non-volatile storage for the computer 600. Although the description of computer-readable media contained herein refers to a mass storage device, such as a hard disk or CD-ROM drive, it should be appreciated by those skilled in the all that computer-readable storage media can be any available computer storage media that can be accessed by the computer 600.

By way of example, and not limitation, computer-readable storage media may include volatile and non-volatile, removable and non-removable media implemented in any method or technology for storage of information such as computer-readable instructions, data structures, program modules or other data. For example, computer-readable storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other non-transitory medium which can be used to store the desired information and which can be accessed by the computer 600.

It should be appreciated that the computer-readable media disclosed herein also encompasses communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media. Computer-readable storage media does not encompass communication media.

According to various embodiments, the computer 600 may operate in a networked environment using logical connections to remote computers through a network such as the network 620. The computer 600 may connect to the network 620 through a network interface unit 606 connected to the bus 604. It should be appreciated that the network interface unit 606 may also be utilized to connect to other types of networks and remote computer systems. The computer 600 may also include an input/output controller 612 for receiving and processing input from a number of other devices, including a keyboard, mouse, or electronic stylus (not shown in FIG. 6). Similarly, an input/output controller may provide output to a display screen, a printer, or other type of output device (also not shown in FIG. 6).

As mentioned briefly above, a number of program modules and data files may be stored in the mass storage device 610 and RAM 614 of the computer 600, including an operating system 618 suitable for controlling the operation of a networked desktop, laptop, or server computer. The mass storage device 610 and RAM 614 may also store one or more program modules. In particular, the mass storage device 610 and the RAM 614 may store the state client 102, the state service 106, the meeting service 110, and/or the other software components described above. The mass storage device 610 and RAM 614 may also store other program modules and data.

In general, software applications or modules may, when loaded into the CPU 602 and executed transform the CPU 602 and the overall computer 600 from a general-purpose computing system into a special-purpose computing system customized to perform the functionality presented herein. The CPU 602 may be constructed from any number of transistors or other discrete circuit elements, which may individually or collectively assume any number of states. More specifically, the CPU 602 may operate as one or more finite-state machines, in response to executable instructions contained within the software or modules. These computer-executable instructions may transform the CPU 602, by specifying how the CPU 602 transitions between states, thereby physically transforming the transistors or other discrete hardware elements constituting the CPU 602.

Encoding the software or modules onto a mass storage device may also transform the physical structure of the mass storage device or associated computer readable storage media. The specific transformation of physical structure may depend on various factors, in different implementations of this description. Examples of such factors may include, but are not limited to: the technology used to implement the computer readable storage media, whether the computer readable storage media are characterized as primary or secondary storage, and the like. For example, if the computer readable storage media is implemented as semiconductor-based memory, the software or modules may transform the physical state of the semiconductor memory, when the software is encoded therein. For example, the software may transform the states of transistors, capacitors, or other discrete circuit elements constituting the semiconductor memory.

As another example, the computer readable storage media may be implemented using magnetic or optical technology. In such implementations, the software or modules may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

Based on the foregoing, it should be appreciated that technologies for providing a meeting-specific state indicator have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method comprising:
receiving requests from a first user and a second user for a state of a third user;
determining whether the first user, the second user, and the third user are invitees to a meeting;
returning, to the first user, a meeting-specific state indicator for the third user in response to determining that the first user and the third user are invitees to the meeting, the meeting-specific state indicator identifying a specific state for the third user with respect to the meeting, the meeting-specific state indicator selected by the third user from a menu comprising a plurality of meeting specific state indicator options, the plurality of meeting specific state indicator options including at least an indicator of an attendance of the third user with respect to the meeting and an indicator of an activity that the third user is performing at the meeting; and
returning, to the second user, a general-purpose state indicator for the third user in response to determining that the second user is not an invitee to the meeting, the general-purpose state indicator indicating that the third user is in the meeting but not providing the specific state for the third user with respect to the meeting.

2. The computer-implemented method of claim 1, wherein the meeting-specific state indicator is shared only with other invitees to the meeting.

3. The computer-implemented method of claim 1, wherein the meeting-specific state indicator indicates that the third user is late for the meeting.

4. The computer-implemented method of claim 1, wherein the meeting-specific state indicator indicates that the third user cannot attend the meeting.

5. The computer-implemented method of claim 1, wherein the meeting-specific state indicator indicates that the third user has checked in for the meeting.

6. The computer-implemented method of claim 1, wherein the meeting-specific state indicator identifies the activity that the third user is performing at the meeting.

7. The computer-implemented method of claim 1, wherein the meeting-specific state indicator indicates that the third user is presenting in the meeting.

8. The computer-implemented method of claim 1, wherein the meeting-specific state indicator indicates that the third user is a next presenter at the meeting.

9. The computer-implemented method of claim 1, wherein the meeting-specific state indicator indicates that the third user is sharing a computer desktop.

10. The computer-implemented method of claim 1, wherein the meeting-specific state indicator identifies a request made by the third user.

11. The computer-implemented method of claim 1, wherein the meeting-specific state indicator indicates that the third user has a question.

12. The computer-implemented method of claim 1, wherein the meeting-specific state indicator indicates that the third user would like a presenter to speed up or slow down a presentation.

13. A system comprising:
one or more processors; and
one or more memories comprising instructions stored thereon that, responsive to execution by the one or more processors, perform operations comprising:
receiving a request to update a state for a user;
determining whether the user is an invitee to an in-progress meeting;
providing a first user interface for specifying a general-purpose state indicator in response to determining that the user is not an invitee to the in-progress meeting; and
providing a second user interface for specifying a meeting-specific state indicator in response to determining that the user is an invitee to the in-progress meeting, the second user interface comprising a menu that includes a plurality of meeting specific state indicator options and enables selection of one of a plurality of meeting-specific state indicator options from the menu, the plurality of meeting specific state indicator options including at least an indicator of an attendance of the third user with respect to the meeting and an indicator of an activity that the third user is performing at the meeting, and the meeting-specific state indicator configured to be provided to one or more other invitees of the in-progress meeting based on a selection of the meeting-specific state indicator option from the menu.

14. The system of claim 13, wherein the instructions, responsive to execution by the one or more processors, perform operations further comprising receiving the meeting-specific state indicator that indicates that the user is running late to the meeting.

15. The system of claim 13, wherein the instructions, responsive to execution by the one or more processors, perform operations further comprising receiving the meeting-specific state indicator that indicates that the user cannot attend the meeting.

16. The system of claim 13, wherein the instructions, responsive to execution by the one or more processors, perform operations further comprising receiving the meeting-specific state indicator that indicates that the user has checked in for the meeting.

17. A computer-readable storage medium having computer-executable instructions stored thereon that, when executed by a computer, cause the computer to perform a method comprising:

receiving requests from a first user and a second user for a state of a third user;

determining whether the first user, the second user, and the third user are invitees to a meeting;

returning, to the first user, a meeting-specific state indicator for the third user in response to determining that the first user and the third user are invitees to the meeting, the meeting-specific state indicator identifying a specific state for the third user with respect to the meeting, the meeting-specific state indicator selected by the third user from a menu comprising a plurality of meeting specific state indicator options, the plurality of meeting specific state indicator options including at least an indicator of an attendance of the third user with respect to the meeting and an indicator of an activity that the third user is performing at the meeting; and returning, to the second user, a general-purpose state indicator for the third user in response to determining that the second user is not an invitee to the meeting, the general-purpose state indicator indicating that the third user is in the meeting but not providing the specific state for the third user with respect to the meeting.

18. The computer-readable storage medium of claim 17, wherein the meeting-specific state indicator comprises an indication that: the third user is a next presenter at the meeting, the third user is sharing a computer desktop, or identifies a request made by the third user.

19. The computer-readable storage medium of claim 17, wherein the meeting-specific state indicator comprises an indication that: a request has been made by the third user, the third user would like a presenter to speed up a presentation, or the third user would like the presenter to slow down the presentation.

20. The computer-readable storage medium of claim 17, wherein the meeting-specific state indicator comprises an indication that the third user is late for the meeting, the third user has checked in for the meeting, or the third user cannot attend the meeting.

* * * * *